United States Patent [19]
Hart

[11] Patent Number: 5,885,627
[45] Date of Patent: Mar. 23, 1999

[54] MOLD FOR FORMING ELASTOMERIC FLANGE LININGS FOR PIPES

[75] Inventor: Keith J. Hart, Kaysville, Utah

[73] Assignee: Envirotech Pumpsystems, Inc., Salt Lake City, Utah

[21] Appl. No.: 729,982

[22] Filed: Oct. 10, 1996

[51] Int. Cl.[6] .................................................. B29C 57/00
[52] U.S. Cl. .......................... 425/385; 264/269; 425/392; 425/DIG. 218
[58] Field of Search ..................................... 425/392, 385, 425/DIG. 218; 264/269; 29/243, 517, 512

[56] References Cited

U.S. PATENT DOCUMENTS

| | | | |
|---|---|---|---|
| 3,142,868 | 8/1964 | Blount | 425/392 |
| 3,147,325 | 9/1964 | Fauber et al. | 425/392 |
| 3,461,505 | 8/1969 | Schroeder et al. | 425/392 |
| 3,482,007 | 12/1969 | Routh | 425/392 |
| 5,199,153 | 4/1993 | Schulte-Ladbeck | 425/392 |

*Primary Examiner*—Patrick Ryan
*Assistant Examiner*—Joseph Leyson
*Attorney, Agent, or Firm*—Trask, Britt & Rossa

[57] ABSTRACT

An elastomeric flange lining is provided for the metal flange of a pipe, the flange lining being structured with an annular channel with allows lateral movement of the elastomeric material of the flange lining when the flange lining is subjected to high compression forces, such as when two pipes are joined together end-to-end at their respective pipe flanges. The design of the flange lining and manner in which the flange lining is produced prevents outward bulging of elastomeric material into the interior of the pipe when subjected to compression forces. A flange mold for forming the flange lining is disclosed, and the method of making the flange lining is also disclosed.

4 Claims, 4 Drawing Sheets

MOLD FOR FORMING ELASTOMERIC FLANGE LININGS FOR PIPES

BACKGROUND

1. Field of Invention

This invention relates to the formation of elastomeric pipe linings, and specifically relates to the formation of elastomeric flange linings for the flanges of such pipes.

2. Statement of the Art

Metal pipe and valve fittings are widely used in many industries as conduits for fluid materials, including liquids and gases. In some industries, such as mining, paper and pulp, and wastewater treatment, fluids containing abrasive solids or corrosive chemicals are transported through vast systems of piping. Because the abrasive solids or corrosive chemicals can damage and deteriorate the inner surface of metal pipes and valves, the pipe and valves are lined with elastomeric materials which are highly resistant to chemical or abrasive corrosion, thereby protecting the inner surface and integrity of the pipe and valve fittings. The technology for lining such pipes and valves is well know.

Lined pipe and valves are typically joined end-to-end to form extensive fluid transport pathways. An inherent problem occurs at the joining of pipe and valves, however, in that the pipe linings of adjacently and co-axially joined pipes must seat tightly against each other and within very small tolerances or the fluid flowing through the pipes will wear on the lining and will seep through the space left between the adjacent linings. Failure of the lining then occurs. The lining will degrade and eventually the lining may delaminate or peel away from the inner surface of the metal pipe. Leakage at the pipe joint results.

In an effort to alleviate such problems, an elastomeric gasket may be positioned between the joined pipes. However, failure can occur in the area of the gasket for the same reasons stated with respect to joined pipe linings. That is, bulging of the elastomeric lining in proximity to the gasket, when the gasket is under compression, exposes the bulging lining to wear and degradation. Infiltration of fluid into any spaces left between the gasket and the adjoining pipe linings on either side of the gasket can lead to erosion and failure of the gasket.

Another means of sealing pipe joints at the adjoining linings has been to extend the elastomeric lining over the flanges at the ends of the pipes to act as a unitary gasket fitting. While an elastomeric flange lining provides a seal of greater integrity, a secondary problem occurs when the adjacent pipes are connected coaxially end-to-end. Specifically, the compression of one elastomeric flange lining against an adjacent elastomeric flange lining when the pipes are bolted together causes the elastomeric material to bulge inwardly toward the interior of the pipe. When abrasive materials or corrosive chemicals flowing through the pipe system encounter the bulge of elastomeric lining at the joining of two pipe linings, the bulge becomes worn and deteriorated, leading to failure of the lining.

Thus, it would be advantageous to provide elastomeric flange linings for pipes and valves which do not bulge inwardly toward the interior of the pipe under compression exerted on the flange linings when adjacent pipes are coaxially joined.

SUMMARY OF THE INVENTION

In accordance with the present invention, a lining for the flange of a lined pipe is structured with an annular channel to allow lateral adjustment of the flange lining when the elastomeric material is compressed against an adjacent solid surface, such as an adjacent flange lining of a coaxially joined pipe, thereby preventing any outward bulging of the flange lining into the interior of the pipe. Although the present disclosure describes the invention in terms of a flange lining for lined pipe, the invention may equally be adapted for use in connection with the flanges of industrial valves and reference herein to pipes is by way of example only.

The flange lining of the present invention is generally formed about the open end of a pipe, along the radially extending flange of the pipe, and is integrally formed with the lining adhered to the interior surface of the pipe. The flange lining extends from a point along the plane of the inner surface of the lining of the pipe and extends radially outward to form an annulus of elastomeric material along a described portion of the pipe flange. The flange lining is formed to the metal flange of the pipe in a manner which provides an annular channel in the flange lining. The annular channel of the flange lining allows the elastomeric material of the flange lining to move laterally (i.e., in a direction perpendicular to and radially outward from a longitudinal axis formed through the pipe) when compressed, thereby preventing the bulging of excess elastomeric material into the interior of the pipe. In a preferred embodiment, the annular channel is formed along the outermost perimeter of the annulus of elastomeric material and adjacent the face of the metal flange of the pipe. Alternatively, however, the annular channel may be formed within the perimeter of the flange lining.

The flange lining is formed to the metal flange of the pipe by positioning a ring of elastomeric material about the open end of a pipe which has been previously lined in a conventional manner. Thus, the ring of elastomeric material is positioned to contact the lining of the pipe. A specially structured flange mold is positioned over the elastomeric ring and is bolted in place against the metal flange of the pipe. The flange mold is structured as a substantially flattened ring having opposing planar faces. Along one planar face of the flange mold is formed a first raised ring and a second raised ring spaced apart from the first raised ring. The first raised ring is positioned in closer proximity to the inner circumference of the flange mold, while the second raised ring is positioned in closer proximity to the outer circumference of the flange mold. The outer circumference of the flange mold approximates the outer circumferential dimension of the metal pipe flange. The first raised ring is generally aligned with the inner surface of the pipe lining. As the flange mold is secured against the metal pipe flange, both the first raised ring and the second raised ring contact the ring of elastomeric material positioned against the metal pipe flange.

As the pipe is cured, a process which involves placing the pipe into an oven and subjecting it to steam at very high temperatures, the elastomeric material becomes soft and the elastomeric ring vulcanizes to the lining of the pipe, thereby forming an integral bond with the lining of the pipe. The bonding of the ring of elastomer to the lining of the pipe produces a unitary member lining the inner surface of the pipe and the face of the metal pipe flange. The flange mold, compressed against the elastomeric ring during curing, causes the softened elastomeric material to conform to the shape of the mold and a substantially flattened ring of elastomeric material is formed against the face of the metal pipe flange. Additionally, the flattened ring of elastomeric material, or flange lining, is formed with an annular channel formed by the impression of the second raised ring in the elastomeric material. The first raised ring provides a right-angled surface against which the softened material of the elastomeric ring forms during curing and a precise inner edge results when the curing process is complete. More importantly, the right-angled surface of the first raised ring compresses the elastomeric material to form a defined inner edge in planar alignment with the inner surface of the pipe lining.

The flange mold causes a bulging of excess elastomeric material in proximity to the first raised ring during the curing process. When the cured pipe is removed from the oven, and the elastomeric material is cooled to ambient temperature, the flange mold is removed. The excess bulging material caused by the impression of the first raised ring is cut from about the interior surface of the flange lining. In so doing, a defined edge of the flange lining, integrally formed to the pipe lining, is provided. The flange lining may preferably be structured to extend beyond the plane of the face of the metal pipe flange a small amount (e.g., 0.100 inch) so that the flange lining is compressed against, and forms a tight seal with, an adjacent and coaxially positioned flange lining of a joined pipe. That is, when two pipes are joined end-to-end, the flange linings of the adjacent pipes are brought into registration against each other and the metal pipe flanges are bolted together. As the adjacent flange linings are placed into compression against each other, the flange linings are laterally compressed, by which is meant that the elastomeric material moves radially outwardly in a direction perpendicular to the compressive force, or perpendicular to the longitudinal axis of the pipe. However, the annular channel formed in each flange lining absorbs the lateral movement of the elastomeric material and no bulging is experienced toward the interior of the pipe. A smooth, uninterrupted lining is therefore provided between the adjacent pipes and integrity of the lining is maintained.

BRIEF DESCRIPTION OF THE DRAWINGS

In the drawings, which illustrate what is currently considered to be the best mode for carrying out the invention.

DETAILED DESCRIPTION OF THE ILLUSTRATED EMBODIMENT

Figure 1:
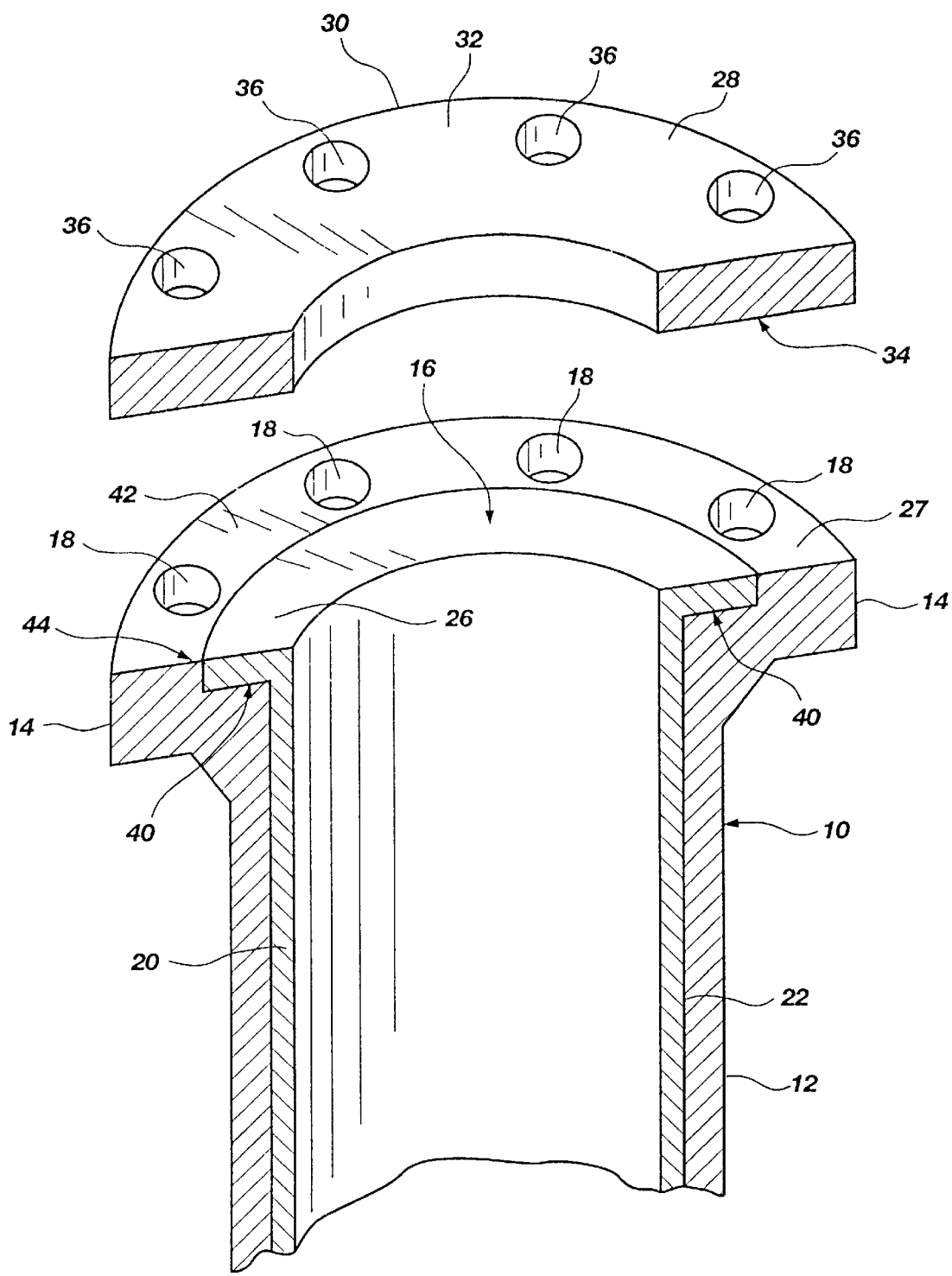
FIG. 1 is a perspective view in cross section of a conventional metal pipe flange and flange lining with a conventional flange mold positioned in proximity to the metal pipe flange.

The present invention addresses a particular problem experienced in the art which is best demonstrated by illustrating the pipe linings of the prior art. Therefore, as shown in FIG. 1, an industrial-type metal pipe 10 is shown having a tubular portion 12 and a pipe flange 14 extending radially outward from the open end 16 of the pipe 10. The pipe flange 14 has formed through the thickness thereof a plurality of apertures 18 sized to received bolts for securing the pipe flange 14 of one pipe 10 to the pipe flange 14 of an adjacent and coaxially aligned pipe 10. As illustrated, the pipe 10 is lined with an elastomeric lining 20 which protects the inner surface 22 of the pipe 10 from deterioration or corrosion. The means for lining pipes 10 with elastomeric material is well-known in the art and is not of immediate relevance to the present invention.

Further, as illustrated in FIG. 1, it is known and practiced in the art to form a flange of elastomeric lining 26 against the outer face 27 of the metal pipe flange 14 so that the flange inning 26 is coextensive with at least a portion of the pipe flange 14. The flange lining 26 serves as a gasket and provides a competent seal when placed in registration with the flange lining 26 of an adjacent metal pipe flange 14 bolted to an adjacent pipe flange 14. The flange lining 26 may be formed against the outer face 27 of the pipe flange 14 by positioning a flap of elastomeric material about the open end 16 of the pipe 10 and bolting an external flange 28 to the pipe flange 14. The external flange 28 comprises a flattened ring 30 of metal having a first planar surface 32 and a second planar surface 34. A number of apertures 36 are formed about the periphery of the flattened ring 30 of metal and are equal in number and dimension to the apertures 18 formed in the pipe flange 14, allowing the external flange 28 to be bolted onto the metal pipe flange 14.

Upon curing (i.e., subjecting the pipe and elastomeric material to steam heat in the temperature range of about 280° F. to about 400° F. for between about 120 minutes and 130 minutes), the flange lining 26 becomes vulcanized and adhered to an annular depression 40 formed in the pipe flange 14 about the open end 16 of the pipe 10. The flange lining 26 itself is conventionally planar in construction and is formed to the pipe flange 14 in proximity to the apertures 18. The flange inning 26 may be flush with the planar face 42 of the pipe flange 14, or the flange inning 26 may extend slightly away from the planar face 42 of the pipe flange 14, as shown at 44. Some trimming or shaping of the flange inning 26 may be required after curing and removal of the external flange 28.

Figure 2:
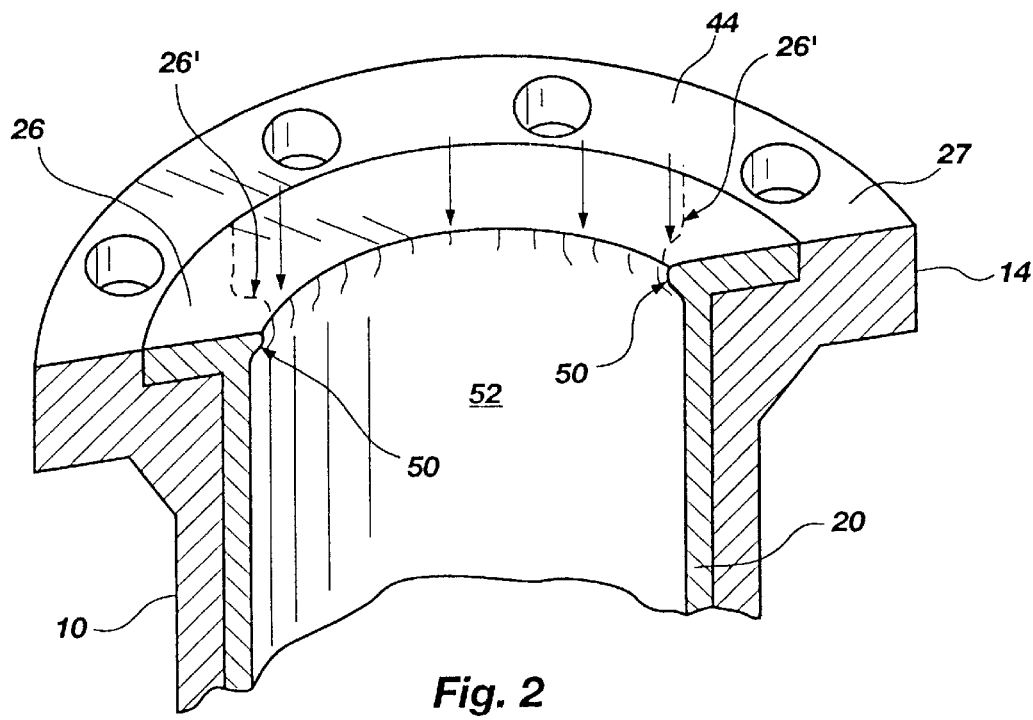
FIG. 2 is a perspective view in cross section of a conventional metal pipe flange demonstrating the bulging which occurs as two pipes are joined end-to-end.

A significant problem occurs with flange linings 26 made in the conventional manner as described. As shown in FIG. 2, when the end planar face 44 of one pipe 10 is secured against an adjacent end of another pipe (not shown) and the adjacent metal pipe flanges 14 are bolted together, the adjacent flange lining 26 is held in compression (suggested by arrows) against the adjacent flange lining 26' (as suggested in partial phantom lines) of the adjacent pipe and the elastomer material tends to bulge outwardly from the flange lining 26, 26', as shown at arrows 50. The inward bulging of the flange lining 26, 26' toward the interior 52 of the pipe 10 exposes the bulging area to abrasion and corrosion from the fluids, or the solids content of the fluids, which are transported through the pipes, and failure of the pipe lining 20 eventually occurs. Field testing and operations have shown that no amount of trimming or preforming of the flange lining 26 has heretofore effectively eliminated the bulging of the flange lining 26 into the interior 52 of the pipe 10 while maintaining the integrity of the lining.

Figure 3:
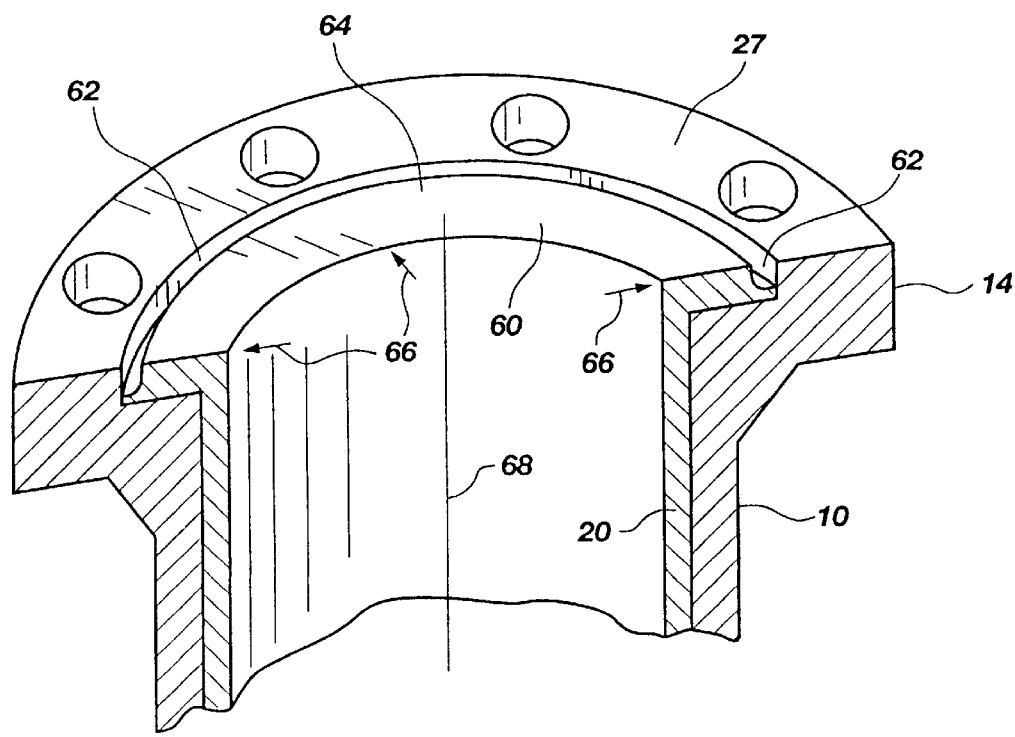
FIG. 3 is a perspective view in cross section of a molded flange lining of the present invention.

Having explained the problem experienced in the prior art, FIG. 3 illustrates the present invention, a flange lining 60 specifically designed to permit lateral movement of the elastomeric material during compression to prevent inward bulging toward the interior 52 of the pipe 10. The objective is carried out by providing a flange lining 60 which is formed with an annular channel 62 extending about the periphery 64 of the flange lining 60. The annular channel 62, as will be explained more fully hereinafter, permits the lateral movement of the elastomeric material, in the direction of arrows 66 (i.e., perpendicular to the line of force), when subjected to compressive forces in the direction of the longitudinal axis 68 of the pipe 10, such as when secured to an adjacent pipe 10 (not shown).

Figure 4:
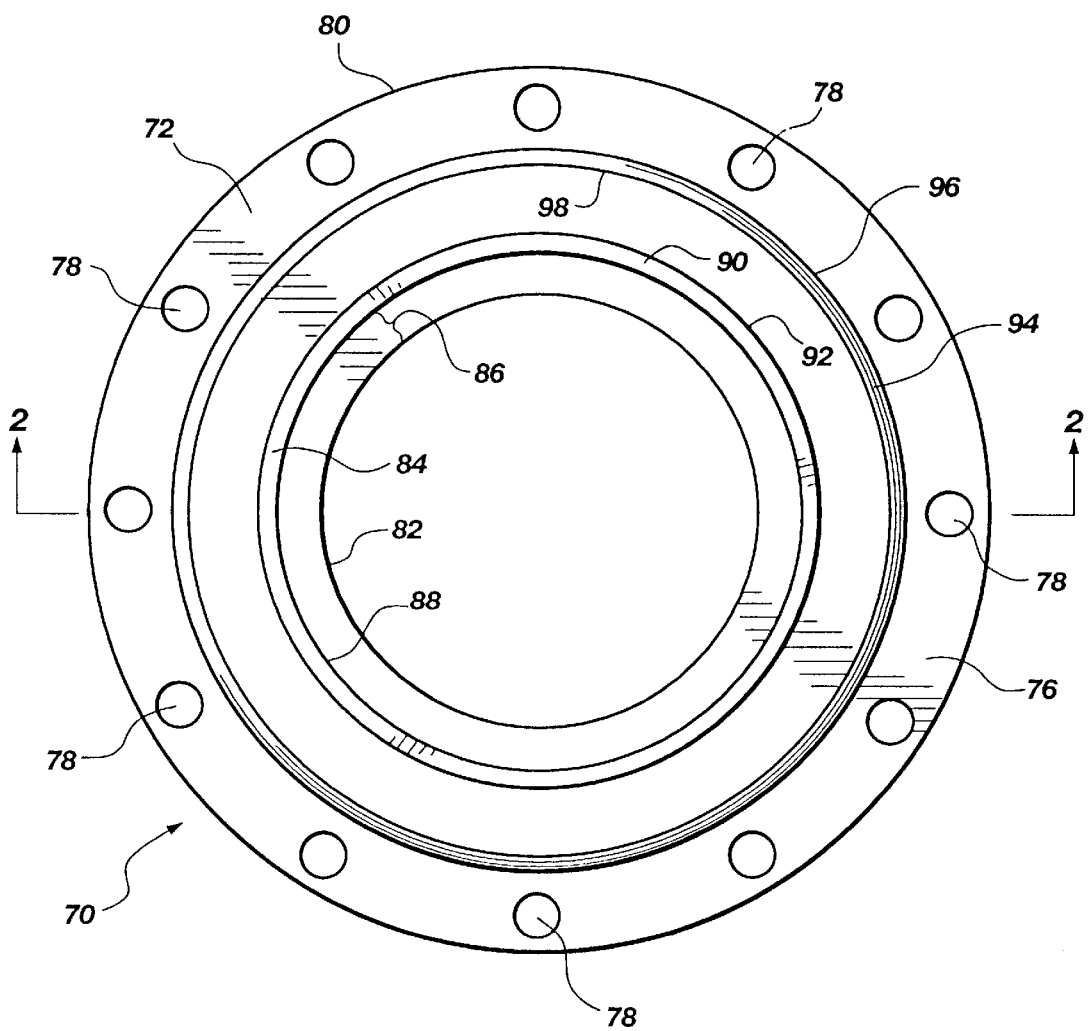
FIG. 4 is a plan view of one side of the flange mold of the present invention.
Figure 5:
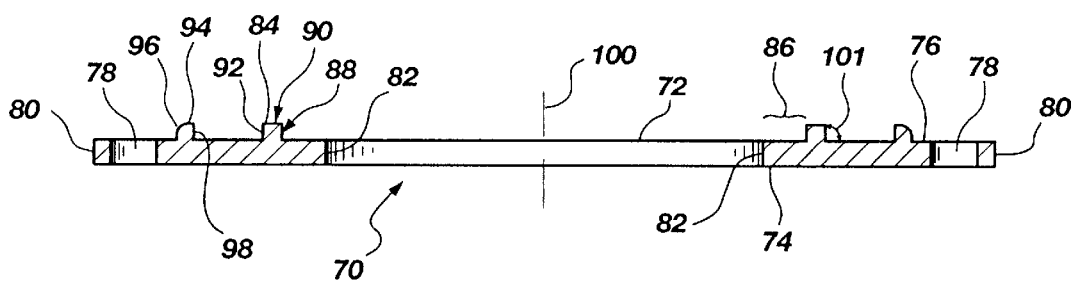
FIG. 5 is side view in cross section of the flange mold shown in FIG. 4 taken at line 2—2.

The flange lining 60 of the present invention is formed in a manner similar to that conventionally used, except that a flange mold 70, as shown in FIGS. 4 and 5, is positioned against the elastomeric material in formation of the flange lining 60. The flange mold 70 comprises a substantially flattened ring 72 which has a first planar side 74 and an opposing, second side 76. A plurality of apertures 78 is formed about the periphery of the flange mold 70 which corresponds in number and dimension to the apertures formed in the metal pipe flange 14 of a pipe 10. The outer circumference edge 80 of the flange mold 70 may be dimensioned to approximate the outer circumference of a metal pipe flange 14. The flange mold 70 also has an inner circumference edge 82 which may extend inwardly toward the interior 52 of a pipe 10.

The second side 76 of the flange mold 70 is formed with a first raised ring 84 which encircles the inner circumference edge 82 and which may be positioned away from the inner circumference edge 82 a selected distance to provide an inner lip 86 of the flange mold 70. The inner lip 86 is not a required element of the flange mold 70 and, in the alternative, the inner circumference edge 82 may be coexistent with the inward face 88 of the first raised ring 84. It should be noted that the first raised ring 84, when viewed in cross section as shown in FIG. 5, has three faces 88, 90, 92 positioned at right angles to each other. By contrast, the second raised ring 94, which is positioned in closer proximity to the outer circumference edge 80 of the flange mold 70, has an arcuate edge 96 connected to a substantially straight inward surface 98 in planar alignment with the longitudinal axis 100 of the flange mold 70.

When the flange mold 70 is positioned over the elastomeric material to form the flange lining 60, the first raised ring 84 is pressed into the elastomeric material and it compresses the elastomeric material in the right angle 101 formed between the outer face 92 of the first raised ring 84 and the surface of the second side 76 of the flange mold 70. The outer face 92 of the first raised ring 84 is in planar alignment with the surface of the lining 20 formed in the pipe 10. The second raised ring 94 presses into the elastomeric material to form the annular channel 62 in the flange lining 60 (FIG. 3). As the pipe 10 and lining 20 are cured by exposure to high heat, the elastomeric material bulges outwardly away from the first raised ring 84 and may come in contact with the inner lip 86 of the flange mold 70.

Figure 6:
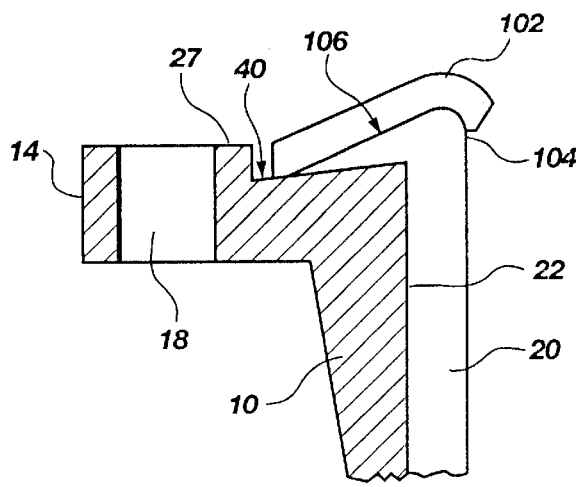
FIG. 6 is a view in elevation of a partial cross section of the pipe flange illustrating how the separate elastomeric ring is positioned to contact the pipe lining prior to curing.

As shown more clearly in FIG. 6, a ring of elastomeric material 102 is positioned over the elastomeric lining 20 which has already been adhered, by known processes, to the inner surface 22 of the pipe 10. The end 104 of the lining 20, however, is folded back into the depression 40 formed in the outer face 27 of the metal pipe flange 14 and may be shaped, such as with a knife, to form an angle 106 extending radially outwardly, but downward into the depression 40. The angle 106 provides a supporting surface upon which the ring of elastomeric material 102 is positioned for curing. A portion of the ring of elastomeric material 102 is positioned over the end 104 of the lining 20. The flange mold 70 is then positioned over the ring of elastomeric material 102 with the apertures 78 aligned to the apertures 18 formed in the pipe flange 14 and the flange mold 70 is bolted in place against the metal pipe flange 14.

Figure 7:
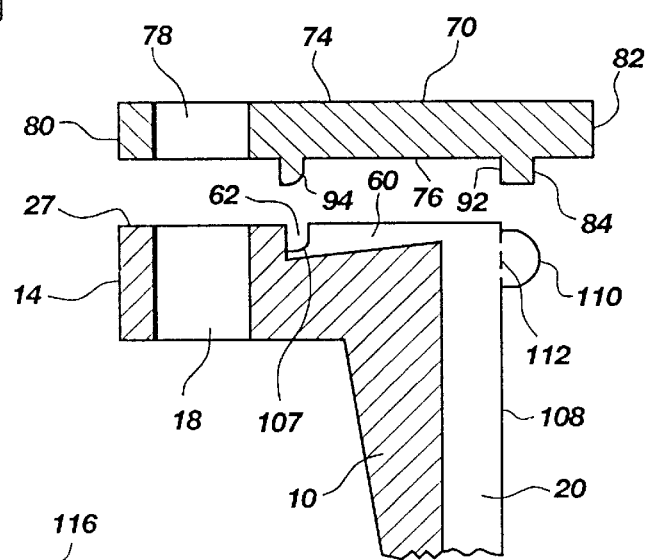
FIG. 7 is a view in elevation of a partial cross section of the flange lining immediately after curing and removal of the flange mold.

During curing, the elastomeric material softens and is flowable to some degree. The elastomeric material, therefore, takes on the shape of the flattened flange mold 70 and a flange lining 60 having an annular channel 62 formed in the periphery of the flange lining 60 results from the impression of the second raised ring 94, as shown in FIG. 7. It should be noted that the second raised ring 94 does not extend fully into the depression 40 formed in the outer face 27 of the metal pipe flange 14 so that flowable elastomeric material flows beneath the second raised ring 94, in the area indicated by arrow 107. The area 107 of elastomeric material positioned below the annular channel 62 assures a competent adherence of the elastomeric flange lining 26 to the metal pipe flange 14 and maintains the integrity of the flange lining 26. Absent an area 107 of elastomer beneath the annular channel 62, the flange lining 26 may separate from the metal pipe flange 14 and lining failure results. The depth of the area 107 of elastomer positioned below the annular channel 62 may be from one sixteenth to one eighth of an inch in thickness. The width of the annular channel 62 may vary depending on the size of the pipe, but the width may, for example, be sized between about 0.25 inch and about 0.20 inch.

The first raised ring 84 acts to keep the elastomeric material in compression during curing and does not allow lateral movement of the elastomeric material toward the interior of the pipe. That factor aids in preventing the outward bulging of the lining 20 under compression as previously described with respect to conventional flange linings. The flowable elastomeric material bulges outwardly during curing to form a bead 110 of excess material which is later removed from the lining 20 along line 112. The bead 110 of elastomeric material may be easily removed with a knife which is occasionally dipped in a lubricating material, such as soapy water. It can be seen that the impression left in the elastomer by the outer face 92 of the first raised ring 84 serves as a guide for removing the bead 110 to provide a smooth and continuous inner surface 108 of the pipe lining 20.

Figure 8:
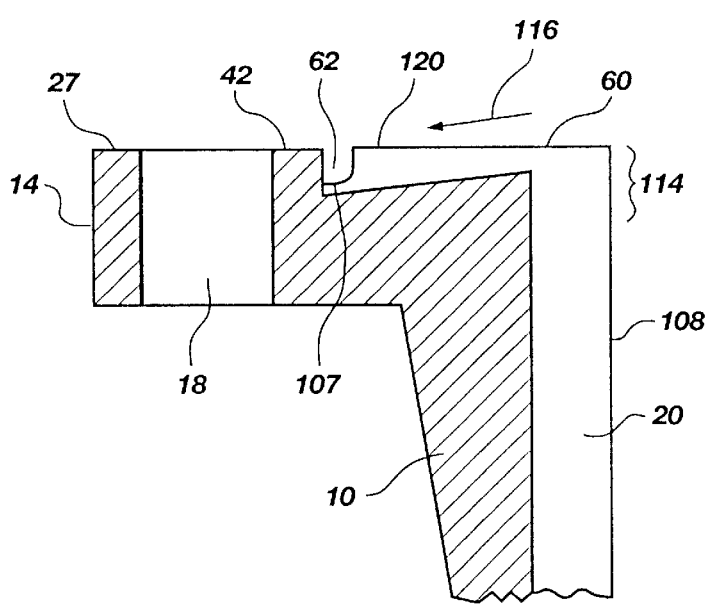
FIG. 8 is a view in elevation of a partial cross section of the metal pipe flange and molded flange lining after the excess material has been removed.

The resulting flange lining 60 is shown in FIG. 8. Because of the particular manner in which the flange lining 60 is formed by the inventive method described herein, no bulging occurs in the upper edge 114 of the flange lining 60 as is experienced in the prior art because when the flange lining 60 is in compression, the compressive forces 116 move the elastomeric material of the flange lining 60 laterally, toward the metal pipe flange 14 and the displaced elastomeric material is allowed to move into, or deflect into, the annular channel 62. When formed, the upper surface 120 of the flange lining 60 may extend slightly above the planar surface 42 of the pipe flange 14 from about 0.70 inch to about 0.130 inch. A tight seal is thereby produced between adjacent pipes.

The flange lining of the present invention provides a significant improvement over the prior art in preventing the bulging of elastomeric material into the interior of the pipe. The flange lining may be adapted to any size or shape of pipe, including the lap end of a pipe, and can be adapted for use with industrial valves. Hence, reference herein to specific details of the illustrated embodiments is by way of example and not by way of limitation. It will be apparent to those skilled in the art that many modifications of the basic illustrated embodiment may be made without departing from the spirit and scope of the invention as recited by the claims.

What is claimed is:

1. A flange mold for forming a flange lining on a lined pipe comprising:

a substantially flattened ring having a first planar side and an opposing second side for positioning against the flange lining of the pipe, and having an inner circumference edge and an outer circumference edge;, a first raised ring extending outwardly from said second side and positioned in proximity to said inner circumference edge for engaging an inner circumferential surface of the flange lining of the pipe;

a second raised ring extending outwardly from said second side and spaced apart from said first raised ring, said second raised ring being positioned in proximity to said outer circumference edge for producing an annular groove in the flange lining of the pipe; and attachment means for securing said substantially flattened ring to a flange of a pipe.

2. The flange mold of claim 1 wherein said second raised ring has an arcuate edge oriented toward said outer circumference edge.

3. The flange mold of claim 1 wherein said second raised ring is configured to produce an area of elastomeric material in the flange lining to assure a competent adherence of the flange lining to the pipe flange and to maintain the integrity of the flange lining.

4. The flange mold of claim 1 wherein said first raised ring further includes a surface oriented away from said inner circumference edge and positioned to engage the inner circumferential surface of the flange lining of the pipe to define a finished inner surface of the said flange lining.

* * * * *